(12) United States Patent
Khurange et al.

(10) Patent No.: US 11,558,455 B2
(45) Date of Patent: Jan. 17, 2023

(54) CAPTURING DATA IN DATA TRANSFER APPLIANCE FOR TRANSFER TO A CLOUD-COMPUTING PLATFORM

(71) Applicants: Ashish Govind Khurange, Pune (IN); Sachin Baban Durge, Pune (IN); Smita Govind Khurange, Pune (IN); Supriya Sitaram Dere, Pune (IN); Prasanna Dattatraya Kulkarni, Pune (IN); Ganesh Tukaram Diwate, Pune (IN); Gitanjali Dilip Jedhe, Pune (IN); Kuldeep Sureshrao Nagarkar, Pune (IN); Ravender Goyal, Saratoga, CA (US)

(72) Inventors: Ashish Govind Khurange, Pune (IN); Sachin Baban Durge, Pune (IN); Smita Govind Khurange, Pune (IN); Supriya Sitaram Dere, Pune (IN); Prasanna Dattatraya Kulkarni, Pune (IN); Ganesh Tukaram Diwate, Pune (IN); Gitanjali Dilip Jedhe, Pune (IN); Kuldeep Sureshrao Nagarkar, Pune (IN); Ravender Goyal, Saratoga, CA (US)

(*) Notice: Subject to any disclaimer, the term of this patent is extended or adjusted under 35 U.S.C. 154(b) by 107 days.

(21) Appl. No.: 15/889,201

(22) Filed: Feb. 5, 2018

(65) Prior Publication Data
US 2019/0045004 A1 Feb. 7, 2019

Related U.S. Application Data

(63) Continuation-in-part of application No. 15/870,828, filed on Jan. 12, 2018, now Pat. No. 11,169,960, and
(Continued)

(51) Int. Cl.
G06F 16/00 (2019.01)
H04L 67/1095 (2022.01)
(Continued)

(52) U.S. Cl.
CPC ........ H04L 67/1095 (2013.01); G06F 3/0607 (2013.01); G06F 3/067 (2013.01);
(Continued)

(58) Field of Classification Search
CPC .......................... G06F 16/113; G06F 16/119
See application file for complete search history.

(56) References Cited

U.S. PATENT DOCUMENTS 10,152,487 B1 * 12/2018 Patwardhan ........ G06F 21/6218
2012/0017096 A1 * 1/2012 Snider ................ G06F 11/1453
713/189
(Continued)

*Primary Examiner* — Thu Nguyet T Le

(57) ABSTRACT

In one aspect, a computer-implemented method useful for migrating hundreds of Terabytes to Petabytes of data to a cloud-computing environment with a data transfer appliance includes the step of providing a data transfer appliance. The data transfer appliance includes an operating system, one or more computing processing units (CPU's), a memory, and a data storage system. The computer-implemented method includes the step of implementing data capture from a data storage system to the data transfer appliance. The computer-implemented method includes the step of storing the dedupe form of the data in the data transfer appliance by; providing a capture utility, wherein the capture utility comprises a data traversal engine and a data read engine.

3 Claims, 11 Drawing Sheets

Related U.S. Application Data a continuation-in-part of application No. 15/638,207, filed on Jun. 29, 2017, now abandoned.

(51) Int. Cl.
| | |
|---|---|
| *G06F 16/185* | (2019.01) |
| *G06F 3/06* | (2006.01) |
| *H04L 67/10* | (2022.01) |
| *H04L 67/1097* | (2022.01) |
| *G06F 16/11* | (2019.01) |

(52) U.S. Cl.
CPC .......... *G06F 3/0608* (2013.01); *G06F 3/0641* (2013.01); *G06F 3/0647* (2013.01); *G06F 16/113* (2019.01); *G06F 16/185* (2019.01); *H04L 67/10* (2013.01); *H04L 67/1097* (2013.01)

(56) References Cited

U.S. PATENT DOCUMENTS

| | | | |
|---|---|---|---|
| 2014/0025796 A1* | 1/2014 | Vibhor | H04L 41/12 709/222 |
| 2016/0011945 A1* | 1/2016 | Upadhyay | G06F 11/1453 707/654 |
| 2016/0170844 A1* | 6/2016 | Long | G06F 16/21 707/679 |
| 2017/0177867 A1* | 6/2017 | Crofton | G06F 21/565 |

* cited by examiner

CAPTURING DATA IN DATA TRANSFER APPLIANCE FOR TRANSFER TO A CLOUD-COMPUTING PLATFORM

CLAIM OF PRIORITY AND CROSS-REFERENCE TO RELATED APPLICATIONS

This application is a claims priority and is a continuation in part of U.S. patent application Ser. No. 15/638,207, titled DATA TRANSFER APPLIANCE METHOD AND SYSTEM and filed on Jun. 29, 2017. This application claims priority to and is a continuation in part of U.S. patent application Ser. No. 15/870,828, titled DATA TRANSFER APPLIANCE METHOD AND SYSTEM and filed on Jan. 12, 2018. These applications are hereby incorporated by reference in their entirety.

BACKGROUND

Field of the Invention

This application relates generally to data storage, and more specifically to a system, article of manufacture and method of capturing data in data transfer appliance for transfer to a cloud-computing platform.

Description of the Related Art

An enterprise may wish to implement the copying and archiving of computer data such that it may be used to restore the original after a data loss event. For example, the enterprise may wish to migrate servers and the server data to a cloud-computing environment. Current methods may lack functionalities that enable the migration of servers to a cloud-computing environment. Many current methods can only be used to migrate archived data in the form of files. Accordingly, improvements to migrating applications to a cloud-computing environment can be implemented.

BRIEF SUMMARY OF THE INVENTION

In one aspect, computer-implemented method useful for migrating hundreds of Terabytes to Petabytes of data to a cloud-computing environment with a data transfer appliance includes the step of providing a data transfer appliance. The data transfer appliance includes an operating system, one, or more computing processing units (CPU's), a memory, and a data storage system. The computer-implemented method includes the step of implementing data capture from a data storage system to the data transfer appliance. The computer-implemented method includes the step of storing the dedupe form of the data in the data transfer appliance by; providing a capture utility, wherein the capture utility comprises a data traversal engine and a data read engine. The data traversal engine generates a listing of data objects in the data storage system, and determines the size of the listed data objects. The computer-implemented method includes the step of splitting the set of data objects into two or more mutually exclusive groups of approximately equal size. The data read engine reads a content of the data objects for a group of the two or more mutually exclusive groups, reads the content of the data objects in the group, and streams the group contents to the transfer appliance.

Figure 1:
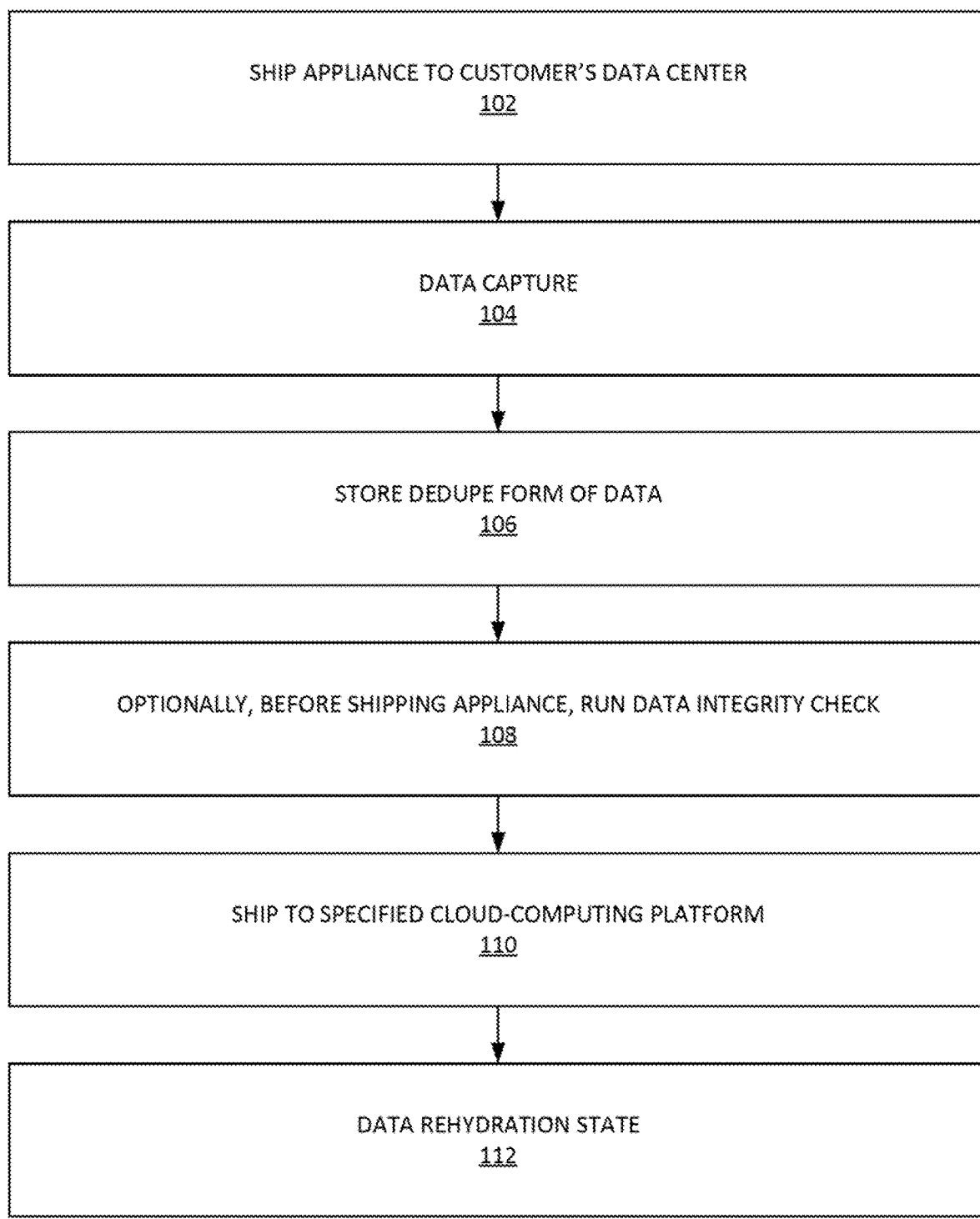
FIG. 1 illustrates an example process for migrating large amounts of data to a cloud-computing environment with an appliance, according to some embodiments.

The Figures described above are a representative set, and are not exhaustive with respect to embodying the invention.

DESCRIPTION

Disclosed are a system, method, and article of manufacture for capturing data in data transfer appliance for transfer to a cloud-computing platform. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth in other instances, well-known structures, materials, or operations are not shown or described in, detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Backup image (or image) cart include copies of programs, system settings, files, etc. It can be a complete system backup that can be used for restore operations.

Chunk can be a fragment of information.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Data deduplication (e.g. 'dedupe', 'deduplication') can refer to the elimination of redundant data.

Dedupe storage network can be represented in the form of a graph topology, where node represents dedupe storage node, and the directed edge represent the data replication path. In dedupe storage network data is replicated in dedupe preserving manner. A data chunk which is present at a dedupe storage node is never replicated to that sane storage node by any other storage node in the dedupe storage network.

GOOGLE® Cloud Storage is a RESTful online file storage web service for storing and accessing data on GOGGLES infrastructure.

HADOOP distributed file system (HDFS) is a distributed, scalable, and portable file system written in JAVA for the HADOOP framework.

Network File System is a distributed file system protocol.

Object storage is a computer data storage architecture that manages data as objects, as opposed to other storage architectures like file systems which manage data as a file hierarchy.

Offline data transfer appliance can be an appliance which is plugged-in in customers data center to capture the data, and rather than transferring the data to cloud over the WAN, this appliance is shipped to cloud platform to ingest data in the cloud storage.

Plugin can be a software component that adds a specific feature to an existing computer program.

Portable Operating System Interface (POSIX) is a family of standards specified by the IEEE Computer Society for maintaining compatibility between operating systems. POSIX defines the application programming interface (API), along with command line shells and utility interfaces, for software compatibility with variants of Unix and other operating systems.

Staging bucket can be an intermediate storage area where customer's captured data is stored in encrypted form. Only the user who has the encryption keys can decrypt the data in its original form.

Wide area network (WAN) can be a telecoms telecommunications network or computer network that extends over a large geographical distance.

Additional example definitions are provided herein.

Example Methods

FIG. 1 illustrates an example process 100 for capturing data in data transfer appliance for transfer to a cloud-computing platform, according to some embodiments. The data-transfer appliance (hereafter 'appliance') can include specialized software (e.g. for implementing the various processes provided infra, etc.), an operating system, one or more CPU's, memory (e.g. RAM), data storage systems, etc. In some examples, the data storage systems can store a petabyte of data. The appliance can include various interfaces for plug-in network cables. The appliance can perform link aggregation. The appliance can assign itself an IP address. A customer can access/manage the appliance using a web browser via a portal.

More specifically, in step 102, process 100 can ship appliance to customer's data center. In step 104, process 100 can implement data capture 104. Two methods of data capture can be implemented. A first method can be workstation capture. With workstation capture, user downloads capture utility on the workstation using appliance web portal. In some examples, workstations can be both Windows® or Linux® based workstations. The capture utility will be used to capture the data available on the workstation. A second method of data capture can be appliance capture. Appliance capture method can export a Network File Share (NFS) SharePoint to appliance and mount to appliance as an NFS mountpoint. Then the appliance can capture the data from the NFS mountpoint. The capture method involves reading data from the storage attached to the workstation. The storage attached to the workstation may be DAS (directly attached storage), NAS (network attached storage), SAN (storage area network), or any other type. The capture utility iterates through the file system, identifies the files to be captured, reads the file data and streams it to the appliance. For each file, metadata such as name, size, file attributes, access control lists and any other such information is streamed to the appliance. The capture utility creates a catalog of files successfully captured and streamed to the appliance.

Figure 2:
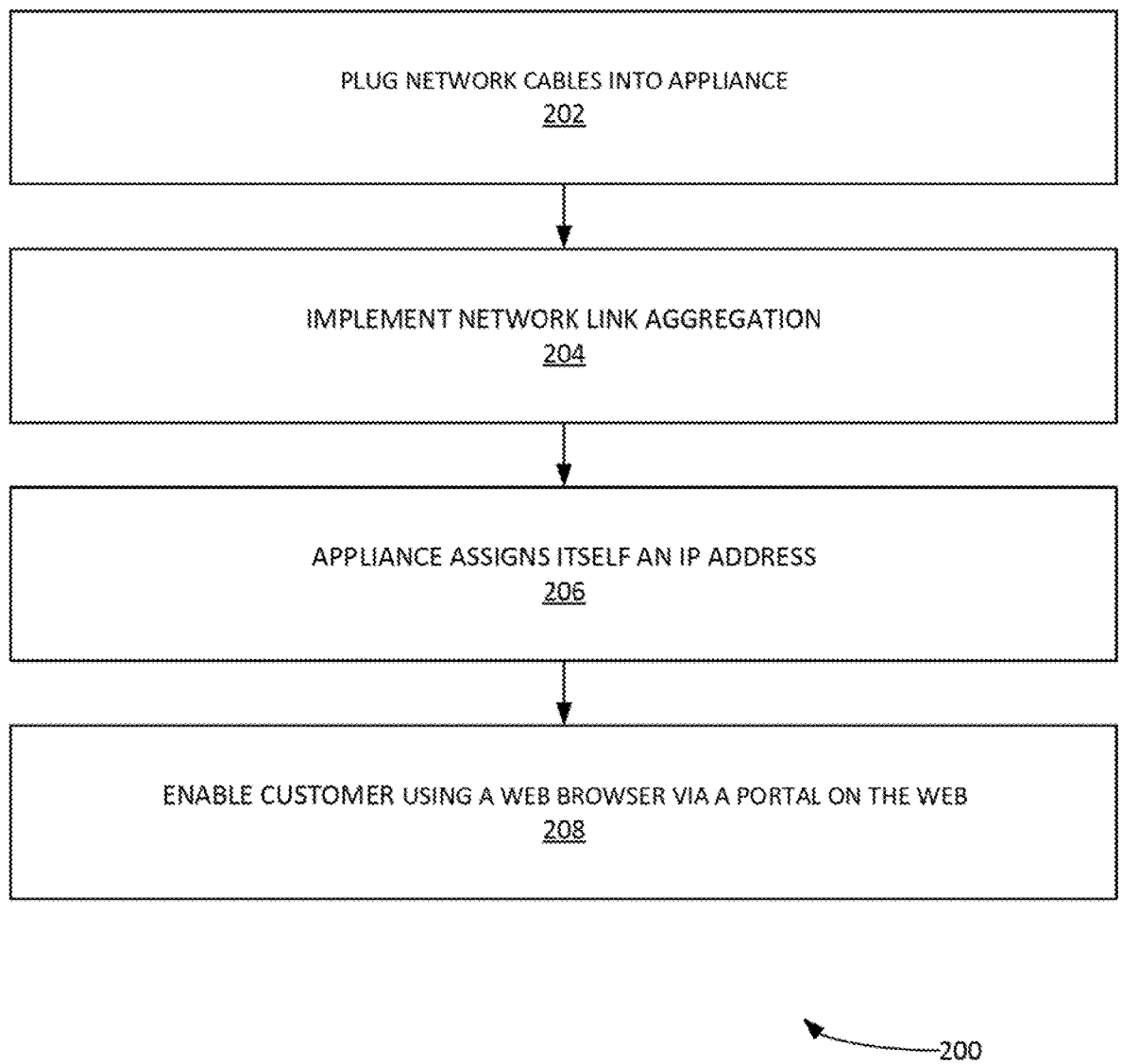
FIG. 2 illustrates an example process for accessing and/or managing an appliance, according to some embodiments.

FIG. 2 illustrates an example process 200 for accessing and/or managing an appliance, according to some embodiments. Process 200 can ship an appliance to customer's data center. In step 202, process 200 can plug network cables into appliance. In step 204, process 200 can implement network link aggregation. In step 206, the appliance assigns itself an IP address. In step 208, process 200 can enable customer to manage data migration using a web browser via a portal.

Figure 3:
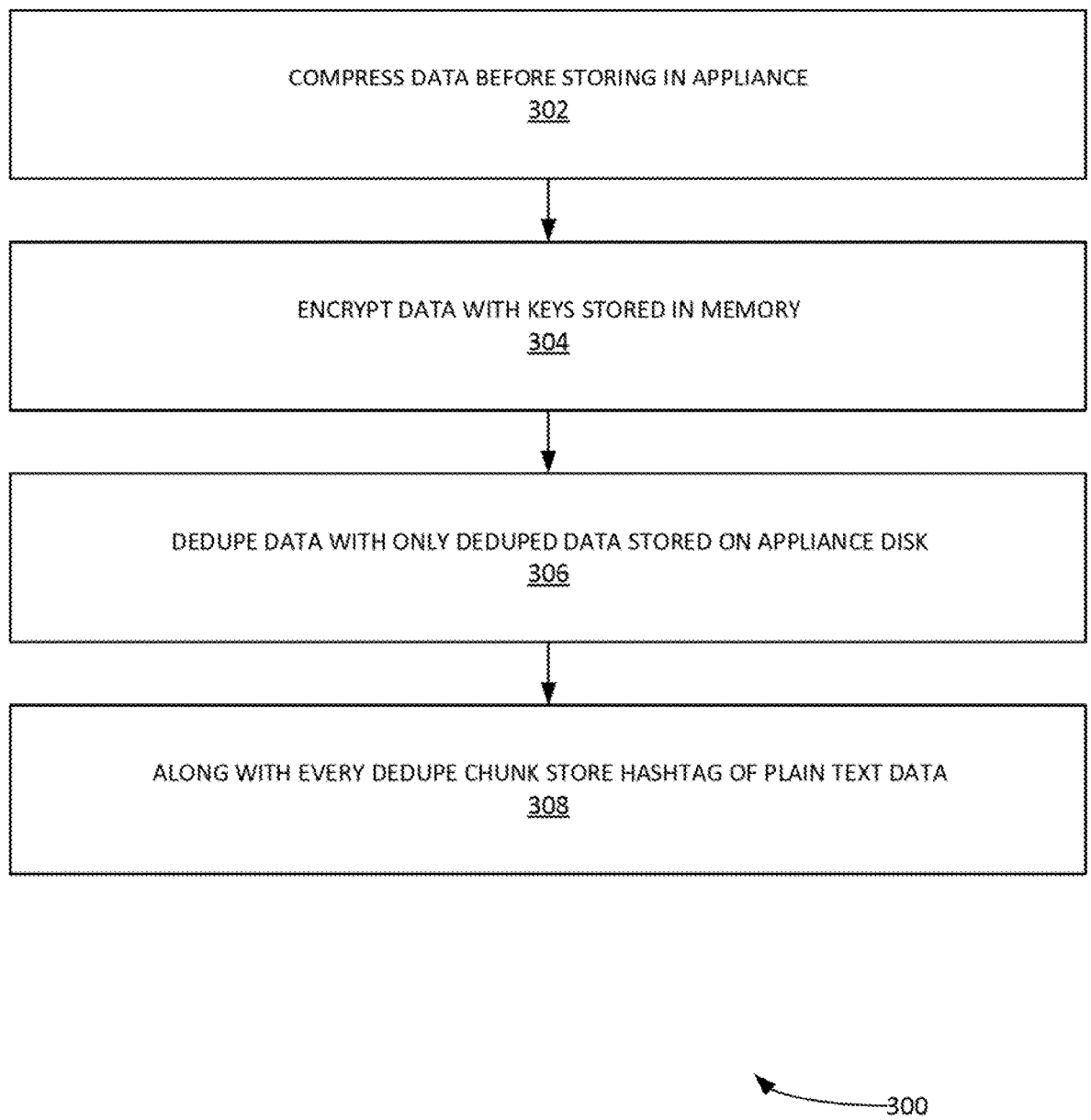
FIG. 3 illustrates an example process for data storage in an appliance using a data dedupe form of data, according to some embodiments.

In step 106, process 100 can store dedupe form of data in the appliance. For example, FIG. 3 illustrates an example process 300 for data storage in an appliance using a data dedupe form of data, according to some embodiments. In step 302, process 300 can compress data before storing in appliance. In step 304, process 300 can encrypt data with keys stored in memory. The customer can provide the relevant keys which are not stored on the appliance but in memory such that they are not available after the appliance shut down. Accordingly, only someone with the encryption keys can recover data from appliance. In step 306, process 300 can dedupe data with only deduped data stored on appliance disk. In step 308, process 300 can, along with every dedupe chunk store hashtag of plain text data 308. In some examples, the appliance data storage size can be from one hundred terabytes (100 TB) to one-half petabyte (0.5 PB). The dedupe process can enable more than one PB of data to be stored on the appliance. It is noted that along with every dedupe chunk, process 300 can also store a hashtag of plain text data. This hashtag is used in the data verification.

Figure 4:
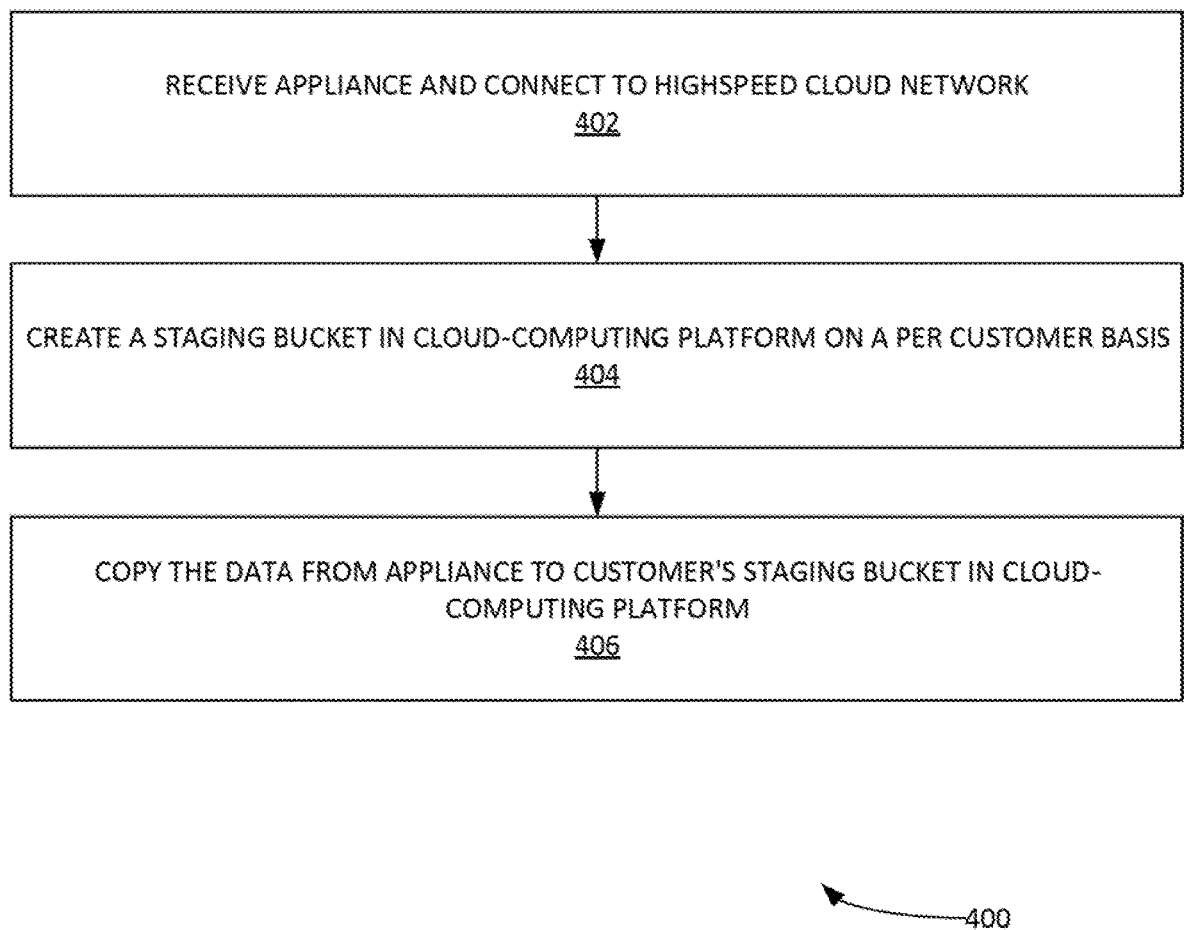
FIG. 4 illustrates an example process for shipping data on a cloud-computing platform from an appliance, according to some embodiments.

Returning to process 100, in step 108, optionally, before shipping appliance, process 100 can run data integrity check. For example, in FIG. 4 illustrates an example process 400 for shipping data to a cloud-computing platform from an appliance, according to some embodiments. In step 402, process 400 can receive appliance and connect to highspeed cloud network. In step 404, process 400 can create a staging bucket in cloud-computing platform on a per customer basis 404. In step 406, process 400 can copy the data (which is in encrypted, compressed and deduped form) from appliance to customer's staging bucket in cloud-computing platform.

Returning to process 100, in step 110, process 100 can ship appliance to a specified cloud-computing platform access point. This can be performed by a third party and/or internal data ingest service that receives the appliance and connects it to a highspeed cloud network. Process 100 can then copy the data to and copy to the specified customer's staging bucket in cloud-computing platform. This can be done without the encryption keys so the third party and/or internal data ingest service cannot determine meaning of the data. Step 110 can also create a staging bucket in the specified cloud-computing platform on a per customer basis. This can hold all the encrypted and compressed dedupe data such that a copy of the appliance is in cloud-based staging bucket.

Figure 5:
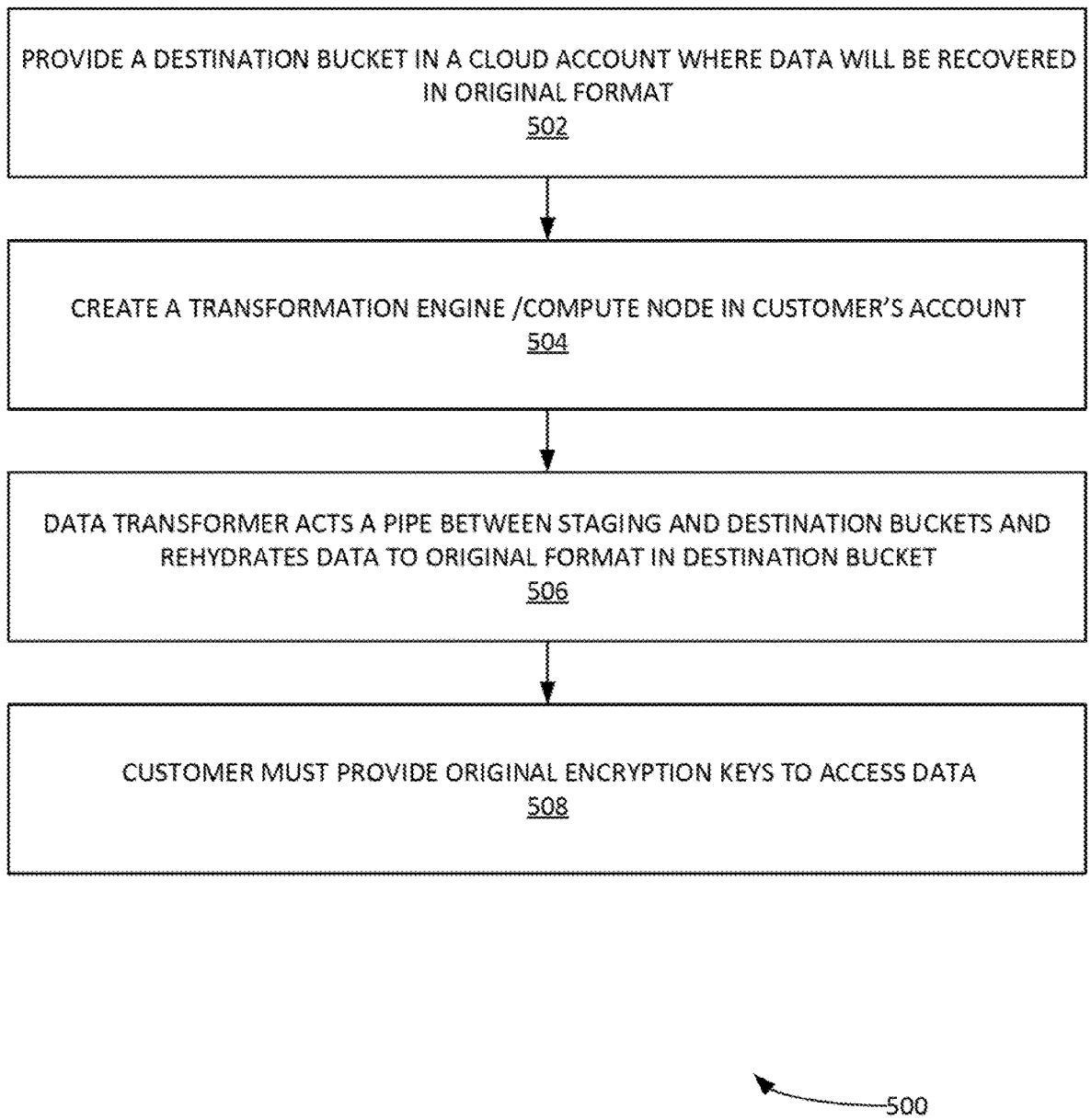
FIG. 5 illustrates an example process for data rehydration, according to some embodiments.

Returning to process 100, in step 112, process 100 can implement data rehydration. For example, in FIG. 5 illustrates an example process 500 for data rehydration, according to some embodiments. Data rehydration can decompress, decrypt and undedupe the data and recover the data in its original format. Process 500 can manage the staging bucket associated with the cloud account. The customer creates a destination bucket where wish to move the data in its original format. Process 500 can create a data transformation engine which is a compute node in customer's account as well. More specifically, in step 504, process 500 can provide a destination bucket in a cloud account. In step 504, process 500 can create a transformation engine/compute node in customer s account. In step 506, process 500 can utilize a data transformation engine to acts as a pipe between two buckets and rehydrate data to original format. In step 508, process 500 can require a customer to provide original encryption keys to access data. Process 500 can utilize customer-provided encryption keys. If the encryption keys don't match, the process 500 does not allow data rehydration.

Figure 6:
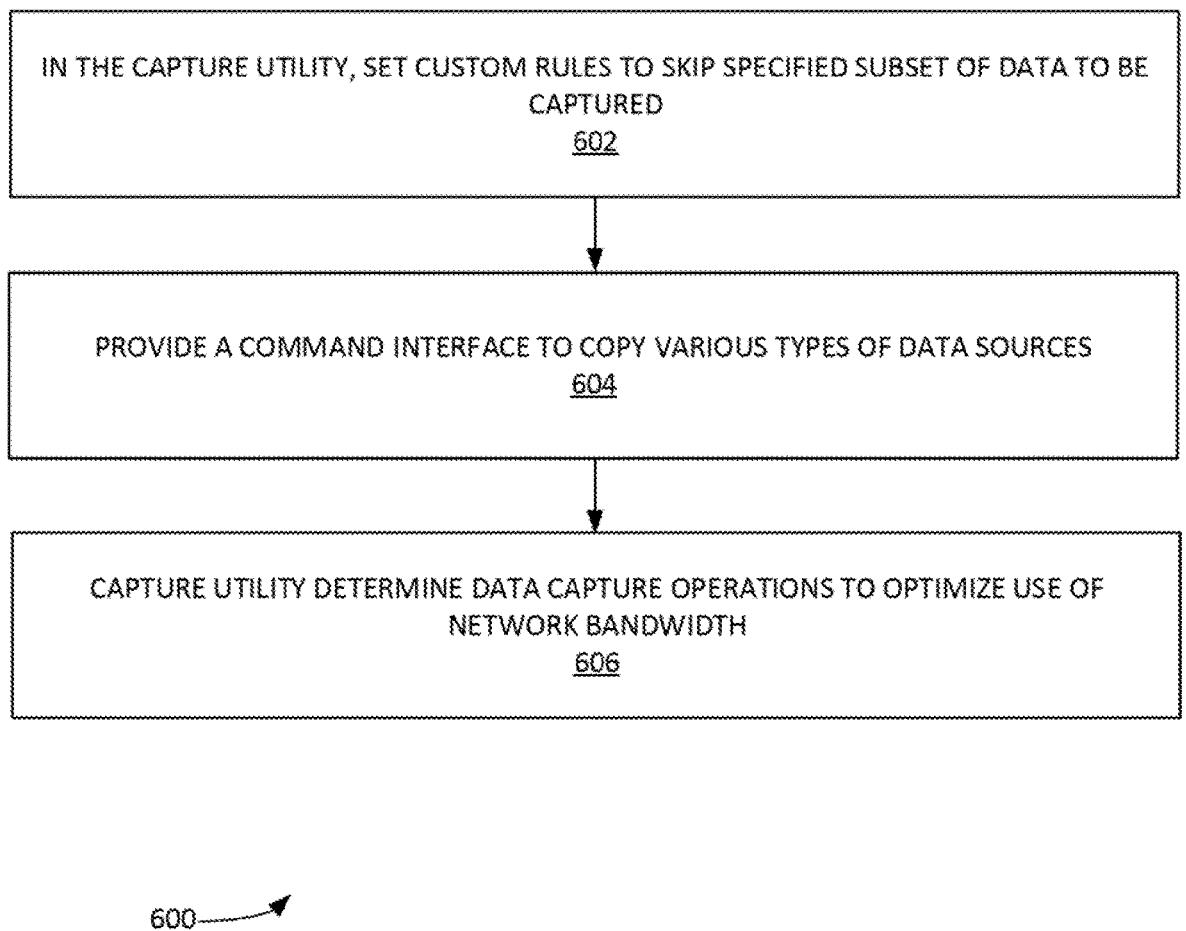
FIG. 6 illustrates an example process capturing data in data transfer appliance for transfer to a cloud-computing platform, according to some embodiments.

FIG. 6 illustrates an example process 600 for capturing data in data transfer appliance for transfer to a cloud-computing platform, according to some embodiments. In step 602, in the capture utility, process 600 can set custom rules to skip specified subset of data to be captured. In step 604, process 600 can provide a command interface to copy various types of data sources. In step 606, process 600 can, with the capture utility, determine data capture operations to optimize use of network bandwidth. It is noted that a customer can specify a set of custom skip rules to skip a specified subset of data captured to the transfer appliance.

Figure 7:
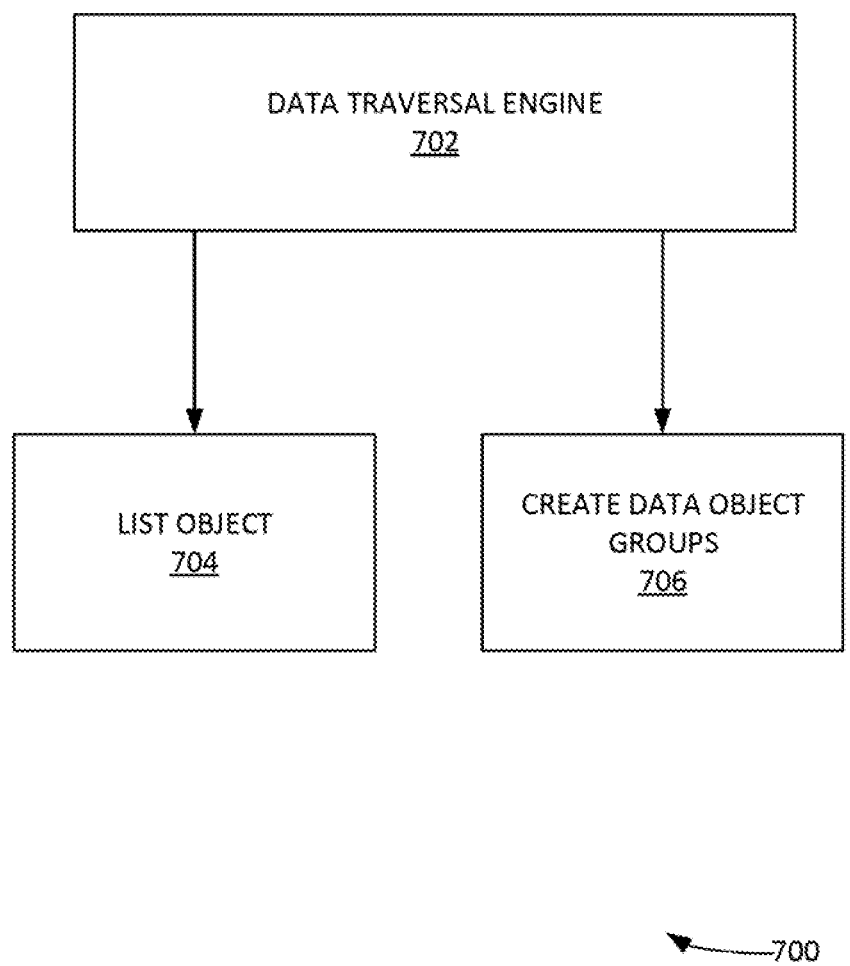
FIG. 7 illustrates an example process of a data traversal engine, according to some embodiments.

FIG. 7 illustrates an example process 700 of a data traversal engine 702, according to some embodiments. Data traversal engine 702 lists out the data objects in the source system to be captured. If user is capturing data from a POSIX compliant file system (e.g. LINUX file system, WINDOWS® file system or a NFS export etc.) user specifies a directory in the file system to capture. It is noted that any new data source can be supported by capture utility by building a data traversal and/or a data-read engine. Data traversal engine traverses source directory, in depth-first-order, traversing subdirectories recursively and listing out all the files inside the source directory. If the user is capturing data from an object store user specifies the object name prefix to capture. Data traversal engine traverses the object storage and lists down all the objects with the mentioned prefix using the REST APIs. Data traversal engine 702 can then split the data objects (either files or objects) into mutually exclusive groups of approximately equal size. Data objects can be added in a single data group, till the total size of all the data objects added in the group is less than 1 TB. Data traversal engine 702 uses two types of operations implemented in the data source. In step 704, data traversal engine 702 generates, a listing of data objects. In step 706, data traversal engine 702 split the data objects into mutually exclusive groups of approximately equal size.

Figure 8:
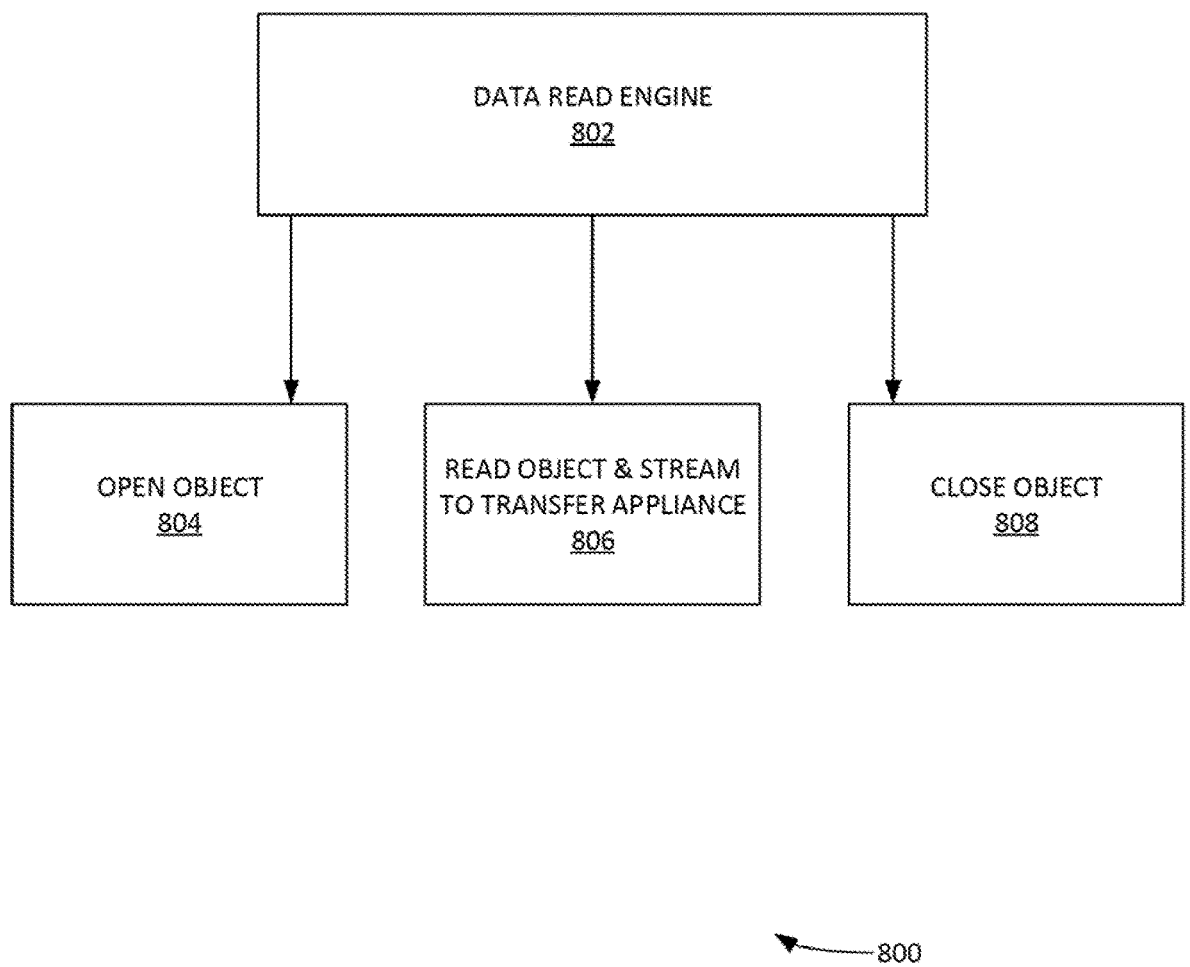
FIG. 8 illustrates an example process of a data read engine, according to some embodiments.

FIG. 8 illustrates an example process 800 of a data read engine 802, according to some embodiments. The data objects groups created by data traversal engine 702, are feed to data read engine 802, to read and stream the data to transfer appliance. Data read engine 802 can read objects for a group. Data read engine 802 can stream group contents to the transfer appliance. Data object read engine 802 can use three operations 804-808 implemented for the data source. In step 804, data read engine 802 can open a data object. In step 806, data read engine 802 can read the contents of the data object. In step 808, data read engine 802 can close the data object.

Figure 9:
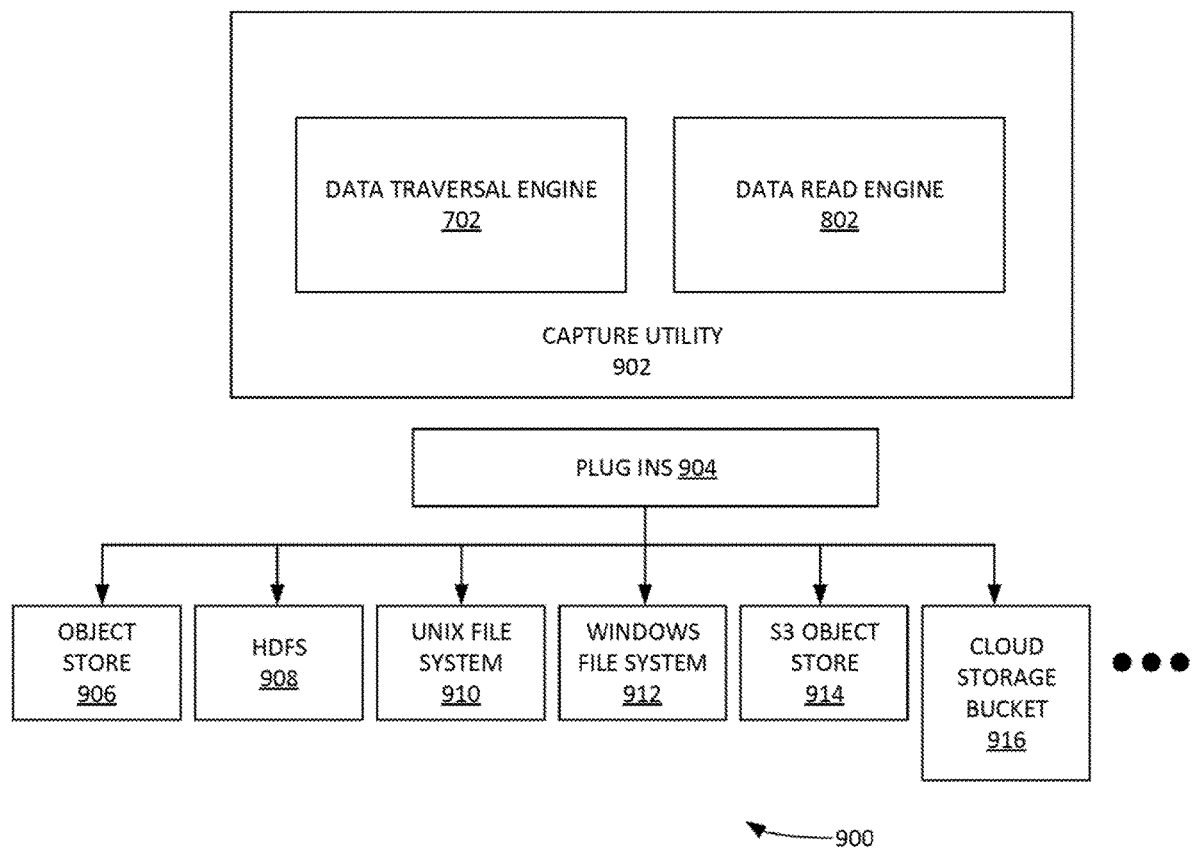
FIG. 9 illustrates an example illustrates processes 700 and 800 implemented in a capture utility, according to some embodiments.

FIG. 9 illustrates an example illustrates processes 700 and 800 implemented in a capture utility 902, according to some embodiments. As shown capture utility 902 can utilize plugins 904. The capture utility can be a plug-able architecture to support any new data source using the data traversal engine 702 and data read engine 802. By implementing these operations, capture utility functionality can be extended to any new data source. For example, the capture utility can have plug-ins written for the Unix file system, WINDOWS® file system, NFS exports, AMAZON® S3 object store, HDFS, GOOGLE® cloud storage bucket, etc.

Out of all these variants of the capture utility, the WINDOWS® file system and Unix file system utility works on the user's workstation. The user can download a capture utility from a transfer appliance web portal and run it on a workstation. Other variants of the capture utility to capture data from NFS exports, S3 object store, HDFS, GOOGLE® cloud storage bucket etc. can run inside the transfer appliance itself. The transfer appliance can provide web user interface (UI) to capture the data from these data sources. The capture utility can be implemented inside the transfer appliance and can establish the connection with the data sources. The capture utility can pull the data from these data sources into the transfer appliance.

Figure 10:
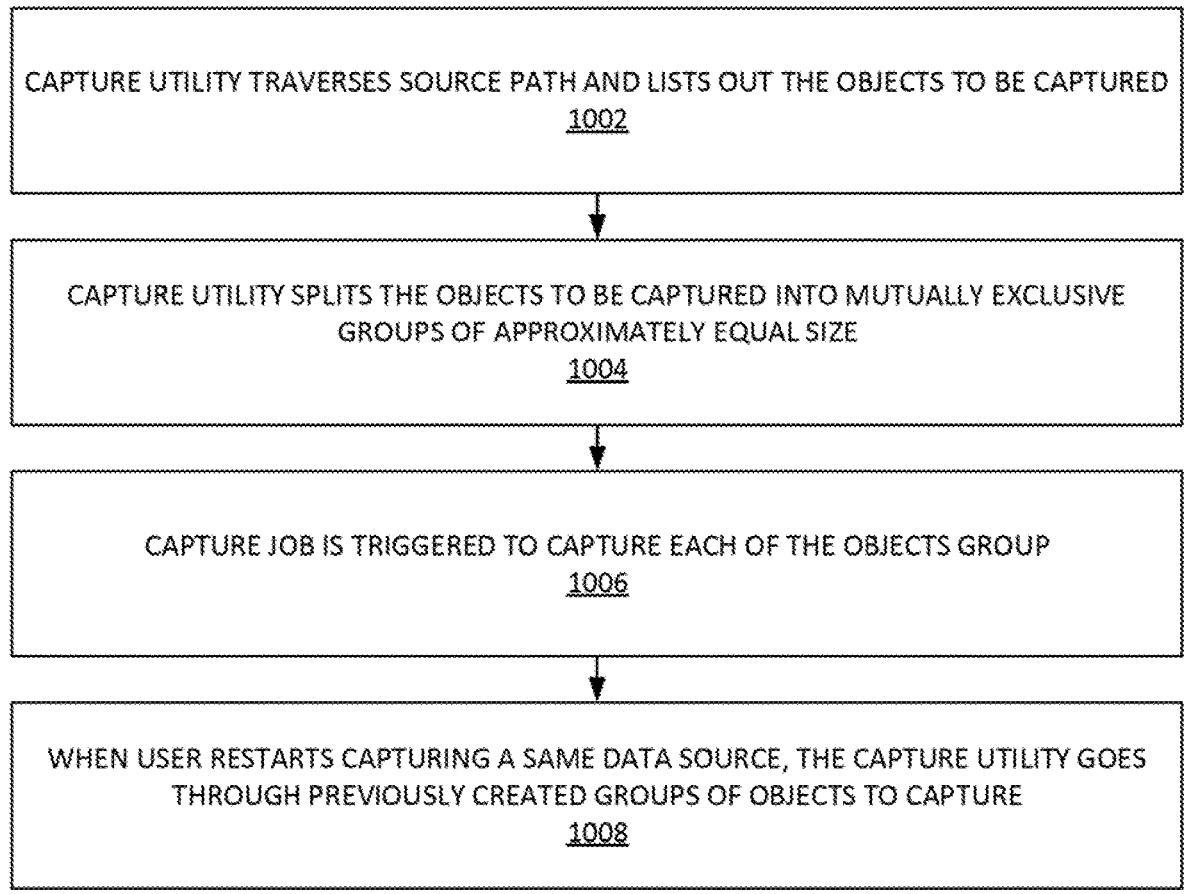
FIG. 10 illustrates an example process for implementing a capture utility, according to some embodiments.

FIG. 10 illustrates an example process 1000 for implementing a capture utility, according to some embodiments. Processes 600-900 can be used to implement process 1000.

In step 1002, for a given a data source (e.g. a Posix file system directory, AMAZON® S3 object prefix, etc.) to capture, the capture utility traverses source path and lists out all the objects to be captured. In step 1004, the capture utility splits the objects to be captured into mutually exclusive groups of approximately equal size.

In step 1006, a capture job is triggered to capture each of the objects group created in step 1004. It is noted that, based on network bandwidth availability, multiple capture jobs can be triggered simultaneously. It is noted that the splitting of source data to capture in several groups and running a capture process to capture a group can provide an advantage in capture process check pointing. If there is network connectivity glitch between transfer appliance and the data source, then only the capture job which is affected by the network connectivity can be restarted.

In step 1008, when user restarts capturing a same data source, the capture utility goes through previously created groups of objects to capture. For each group, the capture utility checks if the data was successfully captured in the transfer appliance in a previous attempt. Only those object groups which were not captured in previous attempt can be retried for the capture.

The capture utility can use two engines such as the data traversal engine 702 data read engine 802 of FIGS. 7 and 8. The capture utility can be a plug-able architecture to support any new data source used to implement the operations of the data traversal engine 702 data read engine 802 (e.g. see FIG. 9 supra).

Exemplary Computer Architecture and Systems

Figure 11:
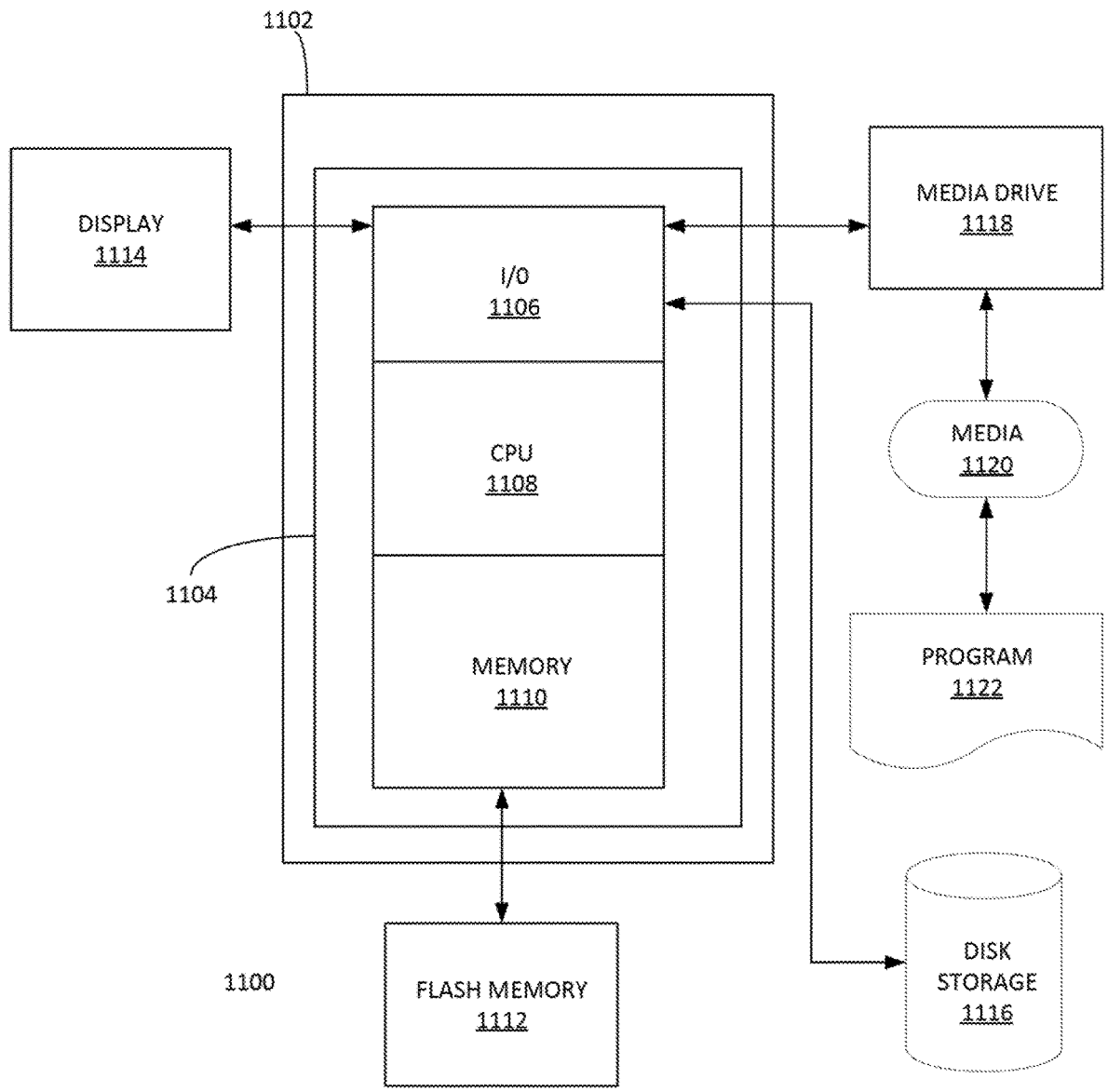
FIG. 11 depicts an exemplary computing system that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled; and operated using hardware circuitry, firmware software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computer-implemented method useful for migrating hundreds of Terabytes to Petabytes of data objects for transferring to a cloud-computing environment with a data transfer appliance comprising:

providing the data transfer appliance, wherein the data transfer appliance comprises an operating system, one or more computing processing units (CPU's), a memory, and a data storage system;

shipping the data transfer appliance to a data center of a customer to implement a data capture process;

plugging a set of network cables of the data center into the data transfer appliance;

implementing a network link aggregation between the data center and the data transfer appliance, wherein the data transfer appliance assigns itself an Internet Protocol (IP) address to enable the customer to manage a data migration using a web browser via a data transfer appliance web portal;

implementing the data capture process using a capture utility to capture the data objects in a data storage system of the data center, and to migrate the data objects to the data transfer appliance, wherein the capture utility comprises the data traversal engine and the data read engine, wherein the capture utility allowing the customer specifies a set of custom skip rules to skip a specified subset of the data objects be captured for transferring to the data transfer appliance;

the data traversal engine: traversing a source directory in depth-first-order, traversing subdirectories recursively, generating a listing of data objects in the data storage system, determining the size of the listed data objects, and splitting the of data objects into two or more mutually exclusive groups of approximately equal size, and wherein the source directory is in the data storage system;

the data read engine: reading a content of the of data objects of each group of the two or more mutually exclusive groups, and streaming the contents of the groups to the data transfer appliance, wherein at least a Petabyte of the data objects is streamed to the data transfer appliance, and compressing the data objects;

encrypting the data objects with encryption keys;

deduplicating the data objects;

storing deduplicated data objects in the data transfer appliance;

dividing the deduplicated data objects into dedupe chunks based on the size of the data transfer appliance;

for each of dedupe chunk storing a hashtag of plain-text data which is used in a data verification;

running data verification check before shipping the data transfer appliance;

creating a staging bucket in the cloud computing environment for the customer;

shipping the deduplicated data objects to the customer's staging bucket in the cloud computing environment.

2. The computer-implemented method of claim 1 further comprising: identifying the data storage system using a LINUX-based file system or WINDOWS-based file system;

downloading the capture utility from the data transfer appliance web portal; and running the capture utility on the customer's workstation.

3. The computer-implemented method of claim 1 further comprising: identifying the data storage system using a Network File Share (NFS) system, a HADOOP distributed file system (HDFS), an object store, or a Google cloud bucket;

downloading the capture utility from the data transfer appliance web portal; and providing a user interface to manage the data capture process from the data transfer appliance.

* * * * *